United States Patent [19]
Yamana

[11] Patent Number: 5,958,597
[45] Date of Patent: Sep. 28, 1999

[54] CERAMIC ELECTRONIC PART

[75] Inventor: Tsuyoshi Yamana, Kyoto, Japan

[73] Assignee: Murata Manufacturing Co., Ltd., Japan

[21] Appl. No.: 08/814,933

[22] Filed: Mar. 12, 1997

[30] Foreign Application Priority Data

Mar. 13, 1996 [JP] Japan ................................. 8-055895

[51] Int. Cl.$^6$ ................................................. B32B 17/00
[52] U.S. Cl. ........................... 428/428; 428/209; 428/210; 428/432; 428/469; 428/472; 428/701; 428/702
[58] Field of Search .................................. 428/208, 209, 428/210, 701, 702, 428, 432, 469, 472

[56] References Cited

U.S. PATENT DOCUMENTS 5,618,470  4/1997  Yamana ................................. 252/512
5,757,609  5/1998  Yamana ................................. 361/305

Primary Examiner—Timothy M. Speer
Attorney, Agent, or Firm—Ostrolenk, Faber, Gerb & Soffen, LLP

[57] ABSTRACT

The present invention provides a ceramic electronic part in which the glass components of a thick film electrode form a glass layer in the vicinity of the interface between the thick film electrode and a ceramic element to sufficiently bond the thick film electrode and the ceramic element even if small amounts of glass components are added, thereby preventing the glass added from interfering with conductivity, and sufficiently obtaining the excellent electrical characteristics of the ceramic element. The ceramic electronic part includes a ceramic element, and baked thick film electrodes provided on both main surfaces of the ceramic element and consisting of a conductive powder and glass frit, wherein each of the thick film electrodes has a conductive layer containing conductive components and a glass layer containing glass components and formed in the vicinity of the interface between the thick film electrode and the ceramic element.

14 Claims, 1 Drawing Sheet

CERAMIC ELECTRONIC PART

BACKGROUND OF THE INVENTION

1. Field of the Invention

The present invention relates to a ceramic electronic part.

2. Description of the Related Art

In forming a thick film electrode by baking a conductive composition comprising a conductive powder, glass frit and an organic vehicle on a ceramic element for an electronic part, such as a ceramic dielectric material, how the ceramic dielectric material and the thick film electrode are bonded is generally important for determining the electrical characteristics of the ceramic dielectric material.

Means for bonding the thick film electrode and the ceramic dielectric material include glass bonding and chemical bonding.

In glass bonding, the glass components of the thick film electrode and the ceramic dielectric material are welded by a melt of the glass components produced by burning in the vicinity of the interface therebetween to bond the thick film electrode and the ceramic dielectric material.

In chemical bonding, a reactive layer is formed by reaction between the glass components and the ceramic dielectric material in the vicinity of the interface therebetween to bond the thick film electrode and the ceramic dielectric material.

However, the conventional bonding means have the following problems: Since the glass components are necessary for bonding the thick film electrode and the ceramic dielectric material in the vicinity of the interface therebetween, a large amount of glass frit is added as a component of the thick film electrode in some cases. In those cases, glass components other than the glass components functioning to bond the thick film electrode and the ceramic dielectric material interfere with the conductivity of the ceramic dielectric material, and thus excellent electrical characteristics of the ceramic dielectric material cannot be sufficiently obtained.

SUMMARY OF THE INVENTION

Accordingly, an object of the present invention is to provide a ceramic electronic part in which the glass components of a thick film electrode form a glass layer in the vicinity of the interface between the thick film electrode and a ceramic element to sufficiently bond the thick film electrode and the ceramic element even if a small amount of glass components is present, thereby preventing the glass present from interfering with conductivity, and sufficiently obtaining the excellent electrical characteristics of the ceramic element.

The present invention has been achieved in consideration of the above object.

In accordance with the present invention, there is provided a ceramic electronic part comprising a ceramic element, and baked thick film electrodes provided on one or more (main) surfaces of the ceramic element and consisting of a conductive powder and glass frit, wherein each thick film electrode comprises a conductive layer containing conductive components and a glass layer containing glass components formed in the vicinity of the interface between the thick film electrode and the ceramic element.

In the ceramic electronic part of the present invention, the average thickness of the glass layer is preferably 0.1 $\mu$m to 1.0 $\mu$m, and more preferably 0.1 $\mu$m to 0.5 $\mu$m.

The average thickness ($\mu$m) of the glass layer(s) is a value obtained by calculating the cross-sectional area ($\mu m^2$) of the glass layers in a cross section through the ceramic element in the direction perpendicular to the main surfaces of the ceramic element, and then dividing the cross-sectional area by the distance of the portion of bonding between the thick film electrodes and the ceramic element, i.e., the distance of the measured interface therebetween, in the cross section.

In the ceramic electronic part of the present invention, the percent metal density of the thick film electrodes after baking which is represented by the equation below is preferably about 85 to 98%, and more preferably about 90 to 98%:

$$((A-B-C)/A) \times 100$$

wherein A is the total cross-sectional area of the thick film electrodes, B is the cross-sectional area of the glass layers, C is the cross-sectional area of pores).

The total cross-sectional area of the thick film electrodes means the cross-sectional area of a cross section through the ceramic element in the direction perpendicular to the main surfaces thereof. The cross-sectional area B of the glass layers means the area of the glass faces appearing in the cross section, and the cross-sectional area C of pores means the area of the pores appearing in the cross section.

In the ceramic electronic part of the present invention, each of the thick film electrodes and the ceramic element may be bonded by a reactive layer formed by reaction between the ceramic element and glass components. In this case, the average thickness of the reactive layers is preferably about 0.5 $\mu$m or less. However, the reactive layers are not necessarily formed, and it is more preferably that the reactive layers are not formed. Even in the case where the reactive layers are not formed, the glass layers are formed, and thus the thick film electrodes and the ceramic element are sufficiently bonded.

The average thickness ($\mu$m) of the reactive layers is a value obtained by calculating the cross-sectional area ($\mu m^2$) of the reactive layers appearing in a cross section through the ceramic element in the direction perpendicular to the main surfaces thereof, and then dividing the cross-sectional area by the distance of a portion of bonding between the thick film electrode and the ceramic element, i.e., the distance of the measured interface therebetween, in the cross section.

In the ceramic electronic part of the present invention, the total of the average thickness of the glass layers including the reactive layers is preferably about 0.1 to 1.5 $\mu$m, and more preferably about 0.1 to 1.0 $\mu$m.

DESCRIPTION OF THE PREFERRED EMBODIMENTS

Figure 1:
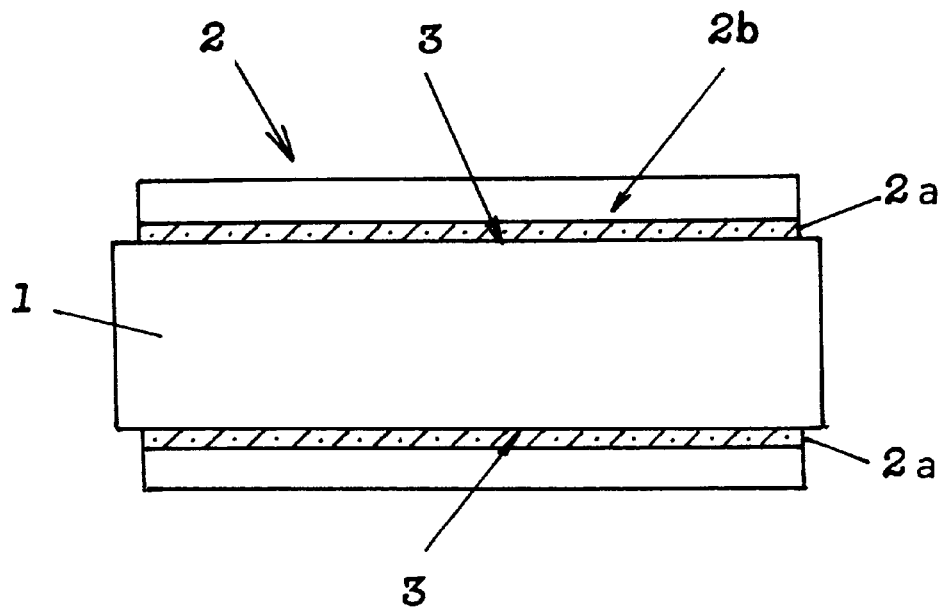
FIG. 1 is a drawing illustrating the sectional structure of the interfaces between a dielectric ceramic and thick film electrodes in accordance with an embodiment of the present invention.

Embodiments of the present invention will be described below.

A ceramic electronic part of the present invention comprises a ceramic element and baked thick film electrodes provided on both main surfaces of the ceramic element and comprising a conductive powder and glass frit. Each of the thick film electrodes comprises a conductive layer containing conductive components, and a glass layer containing glass components and formed in the vicinity of the interface with the ceramic element. Such a structure has good bonding strength even with a low content of glass components, and is capable of preventing the glass, as much as possible, from interfering with conductivity because of the small amount of glass thereby sufficiently obtaining excellent electrical characteristics of the ceramic element.

Namely, the glass components aggregate in the vicinity of the interfaces between the thick film electrodes and the ceramic element, and thus function to bond the thick film electrodes and the ceramic element. Therefore, even with a small amount of glass frit, the thick film electrodes and the ceramic element can sufficiently be bonded.

All components of the glass frit are not necessarily contained in the glass layers of the product, but the glass components can partly remain in the conductive layers or may react with the ceramic element to form the reactive layers. However, it is confirmed that most of the glass components contribute to the formation of the glass layers. Similarly, the conductive components of the conductive layers partly remain in the glass layers.

In the thick film electrodes of the present invention, the average thickness of the glass layers (excluding the reactive layers) may be about 0.1 to 1.0 $\mu$m. If the amount of the glass frit added is excessively small, the average thickness is less than about 0.1 $\mu$m, and glass floats on the surface layers of the electrodes. Glass on the surface layers repels solder and thus significantly deteriorates solderability, thereby undesirably decreasing terminal strength. The average thickness is more preferably about 0.1 to 0.5 $\mu$m. This is because sufficient bonding strength is maintained, and the solderability is improved due to further improvement in the degree of sintering.

Since the ceramic electronic part of the present invention has the above structure, the metal density of the thick film electrodes after baking, which is represented by the above-described equation, can be increased to as high as about 85 to 98%.

As a result of intensive research, the inventor found that in order to obtain such a thick film electrode structure with a high metal density, the average particle size and dispersibility of the conductive powder added must be taken into consideration. In the present invention, the above-described electrode structure was formed by appropriately controlling the average particle and dispersibility of the conductive powder added.

For example, by using a conductive powder having a fine particle size and high dispersibility, the thick film electrode and the ceramic element can be bonded by adding a small amount of glass frit, as compared with the use of a conductive powder having coarse particle size and low dispersibility.

The average particle size and dispersibility are represented by the following values:

Specific surface area (m$^2$/g): total area (m$^2$) per g of powder.

Average particle size ($\mu$m) (D): primary particle size calculated from the powder surface area on the theoretical assumption that there is no aggregation, and D=6÷density (g/cm$^3$)÷specific surface area (m$^2$/g).

Median size ($\mu$m) (D50): particle size at 50% of the particle size cumulative distribution measured by a particle size distribution measuring apparatus. This value is affected by aggregation of the powder.

In the invention, D is preferably about 0.4–2, more preferably about 0.5–1.6, and dispersibly is preferably about 65–90%, more preferably about 70–85%.

Dispersibility (%): ratio of the average particle size to the median size $$(D/D50) \times 100.$$

In the present invention, the reasons for limiting the metal density of the thick film electrodes after baking to the above range are as follows:

The reason for limiting the metal density to about 85% or more is that a thick film electrode having a metal density of less than about 85% and containing a large amount of glass layer exhibits low conductivity, and the basic characteristics of the ceramic element, such as electrostatic capacity and dissipation factor undesirably deteriorate. On the other hand, the reason for limiting the metal density to about 98% or less is that when glass is not sufficiently present, the bonding strength between the thick film electrode and the ceramic element undesirably deteriorates. The metal density is more preferably about 90 to 98%. This is because the solderability is improved more due to further improvement in the degree of sintering of the thick film electrodes.

In the thick film electrodes in accordance with the present invention, cavity portions other than the conductive layer and the glass layer, which are referred to as "pores", are formed in some cases. In the case where the pores are formed, the total cross-sectional area of the thick film electrodes required for measuring the metal density means the total of the cross-sectional area of the conductive layers, the cross-sectional area of the glass layers and the cross-sectional area of the pores. The cross-sectional area of the pores means the area of depressed regions in the cross section, which is shown by the area in the same plane as the cross section.

When the above reactive layers are formed in the ceramic electronic part of the present invention, the average thickness of the reactive layers is preferably about 0.5 $\mu$m or less. If the average thickness of the reactive layers exceeds about 0.5 $\mu$m, the conductivity of the thick film electrodes deteriorates, and thus the basic characteristics of the ceramic element, such as the electrostatic capacity and the dissipation factor, undesirably deteriorate.

In the ceramic electronic part of the present invention, the total of the average thickness of the nonreactive glass layers and the average thickness of the reactive layers is preferably about 0.1 to 1.5 $\mu$m. If glass frit is present in an amount which causes a total of less than about 0.1 $\mu$m, sufficient bonding strength cannot be obtained. On the other hand, if glass frit is present in an amount which causes a total of over about 1.5 $\mu$m, conductivity of the thick film electrode deteriorates, thereby undesirably deteriorating the basic characteristics of the ceramic element, such as the electrostatic capacity and the dissipation factor. The total of the average thicknesses is more preferably about 0.1 to 1.0 $\mu$m. The reactive layers which form chemical bonding are not necessarily formed. Hence, if the reactive layers are not formed, the total of the average thicknesses represents the average thickness of the glass layers only.

The composition of the conductive powder used in the present invention is not specifically limited to powders of noble metals such as Cu, Ag, Pd, Pt, and the like, which were used in examples; powders of base metals such as Ni, Al and the like, and alloy powders can also be used for forming the same thick film electrode structure having the same effect as described above. It is more preferable to use Cu.

The composition of the glass frit used in the present invention is not limited to the glass type comprising boron oxide, lead oxide and zinc oxide, which was used in the examples, and a glass type comprising bismuth oxide, cadmium oxide, boron oxide and cobalt oxide, and various other glass types can be used. Thus, the glass composition is not limited, and the effects of the present invention can be obtained using any glass type as long as the thick film electrodes have the above structure after baking, the average thickness of the glass layers or the reactive layers is within the above range, and the total of the average thicknesses is within the above range.

In the present invention, in order to decrease the occurrence of the glass layers at the interfaces between the thick film electrodes and the ceramic element, the amount of the glass frit present is preferably as small as possible. This is because when the metal density is taken into account, a decrease in the amount of glass frit improves the degree of sintering of the thick film electrodes, and causes the effect of improving the solderability of the thick film electrodes.

Specifically, the amount of the glass frit added is preferably about 1.0 to 10% by weight of the total of 100% by weight of the conductive powder and the glass frit. Within this range, a proper value can be obtained for the glass layers, the reactive layers or the metal density.

The organic vehicle used in the present invention is a component for pasting the conductive powder and the components of the glass frit, and such an organic vehicle is not limited. Preferable examples of such a vehicle include inert organic vehicles such as a vehicle obtained by dissolving ethyl cellulose in terpineol, a vehicle obtained by dissolving an acrylic resin in terpineol, and the like.

Examples of the electronic part in accordance with the present invention include a plate-shaped ceramic capacitor, a laminated ceramic capacitor, and the like, each of which comprises dielectric ceramic as the ceramic element.

Although the present invention will be described in further detail below with reference to examples, the present invention is not limited to these examples.

EXAMPLES

Figure 2:
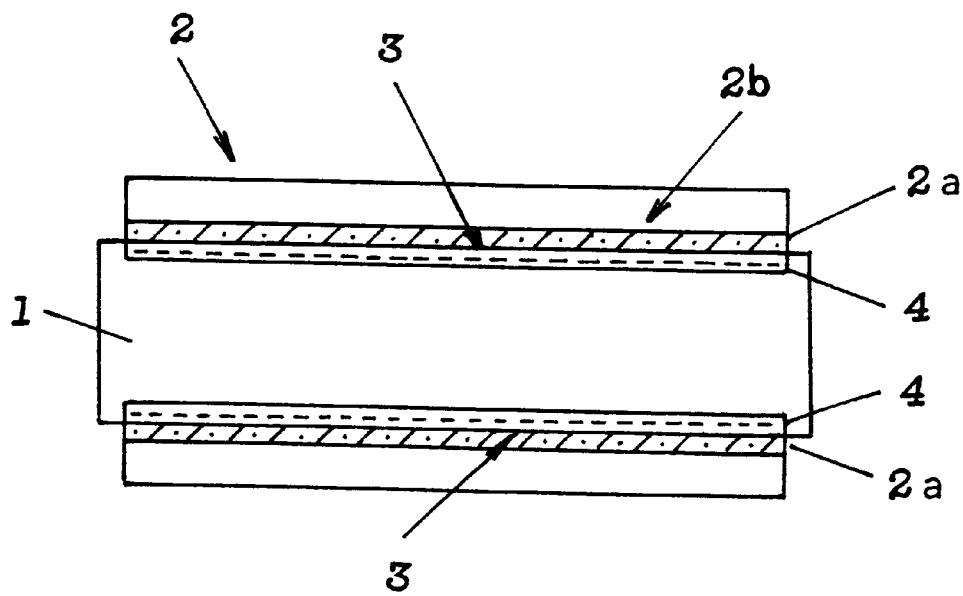
FIG. 2 is a drawing illustrating the sectional structure of the interfaces between a dielectric ceramic and thick film electrodes in accordance with another embodiment of the present invention.

A plate-shaped ceramic capacitor will be described below as an example of the ceramic electronic parts in accordance with the present invention. FIGS. 1 and 2 are drawings illustrating the sectional structure of a plate-shaped ceramic capacitor.

The plate-shaped ceramic capacitor shown in FIG. 1 comprises a ceramic dielectric material 1 serving as a ceramic element, and baked thick film electrodes 2 provided on both main surfaces thereof opposite to each other. Each of the thick film electrodes 2 comprises a glass layer 2a formed as a substantially layer in the vicinity of the interface 3 with the ceramic dielectric 1, and a conductive layer 2b formed as a substantially layer on the glass layer 2a.

The plate-shaped ceramic capacitor shown in FIG. 2 further comprises a reactive layer 4 formed as a substantially layer below the interface 3 by reaction of part of the glass components of each of the baked thick film electrodes 2 and the components of the ceramic dielectric 1.

The composition, structure and characteristics of the plate-shaped ceramic capacitor will be described.

Example 1

A conductive composition comprising a copper powder as the conductive powder was produced by the following process:

To a fine copper powder (metal density 8.933 g/cm$^3$, average particle size 0.56 $\mu$m, dispersibility 81%), boric acid in an amount of 0.01 to 0.5 wt % in terms of boron atomic weight relative to the fine copper powder, and a solvent (ketone, hydrocarbon or aromatic solvent) in an amount which causes a concentration of boric acid lower than the saturation point were added and mixed. Only the solvent was then evaporated by drying to form a fine copper powder.

70 wt % of the fine copper powder obtained by the above-descried surface treatment, an amount of PbO-B$_2$O$_3$-ZnO glass frit (PbO=40, B$_2$O$_3$=40, ZnO=20 mol % main component as disclosed in Japanese Application No. 7-279170, glass dielectric constant $\epsilon$=21) shown in Table 1, and the balance of organic vehicle produced by dissolving 8 wt % of ethyl cellulose in terpineol were prepared. These components were then sufficiently dispersed by using a kneader such as a three-roll mill or the like to produce various copper pastes for baked electrodes.

The amount of glass frit was specified by the ratio (%) to the total amount of the copper powder added as a solid component and the glass frit added, as shown in Table 1.

$$\% \text{ glass} = 100 \times \frac{\text{amount of glass}}{\text{copper amount} + \text{glass amount}}$$

Therefore, during preparation, the ratio of the glass contained in the thick film electrodes except for the solvent evaporated after burning and the vehicle can be determined. In the examples below, the amount of the glass frit was specified by the same equation.

The paste obtained was screen-printed on a barium titanate ceramic dielectric material having a diameter of 14.0 mm and a thickness of 0.5 mm, and then burned at a burning temperature of 600° C. for 60 minutes in an N$_2$ atmosphere to form a plate-shaped capacitor.

Table 1 shows the results of measurement of the electrostatic capacitor (Cap), dissipation factor (DF), bonding strength, solderability, metal density, and the average thicknesses of the glass layer and the reactive layer of the thus-obtained ceramic capacitors.

TABLE 1

| Amount of Glass Added (%) | Metal Density (%) | Average Thickness ($\mu$m) | | | Solderability | Cap (nF) | Df (%) | Bonding strength (kg) | Overall Evaluation |
| --- | --- | --- | --- | --- | --- | --- | --- | --- | --- |
| | | Glass Layer | Reactive Layer | Total | | | | | |
| 22 | 73 | 3.2 | 2.2 | 5.4 | x | 9.41 | 2.28 | — | x |
| 20 | 76 | 3.0 | 2.1 | 5.1 | x | 10.37 | 2.13 | — | x |
| 18 | 80 | 2.6 | 1.2 | 3.8 | x | 12.24 | 2.00 | — | x |
| 16 | 80 | 2.4 | 1.0 | 3.4 | x | 15.31 | 1.92 | — | x |

TABLE 1-continued

| Amount of Glass Added (%) | Metal Density (%) | Average Thickness (μm) | | | Solderability | Cap (nF) | Df (%) | Bonding strength (kg) | Overall Evaluation |
| --- | --- | --- | --- | --- | --- | --- | --- | --- | --- |
| | | Glass Layer | Reactive Layer | Total | | | | | |
| 14 | 83 | 2.2 | 0.9 | 3.1 | x | 16.71 | 1.65 | — | x |
| 12 | 85 | 2.1 | 0.6 | 2.7 | x | 20.08 | 1.25 | — | x |
| 10 | 86 | 1.0 | 0.4 | 1.4 | ◎ | 22.35 | 0.90 | 0.8 | ◎ |
| 8 | 90 | 0.5 | 0.2 | 0.7 | o | 22.57 | 0.86 | 1.6 | o |
| 6 | 93 | 0.2 | 0.2 | 0.4 | o | 24.21 | 0.71 | 3.2 | o |
| 4 | 96 | 0.2 | 0.0 | 0.2 | o | 25.42 | 0.70 | 4.2 | o |
| 2 | 98 | 0.1 | 0.0 | 0.1 | o | 26.40 | 0.68 | 4.3 | o |
| 1 | 97 | 0.1 | 0.0 | 0.1 | o | 25.20 | 0.68 | 4.4 | o |
| 0.0 | 94 | 0.0 | 0.0 | 0.0 | x | 17.02 | 1.52 | — | x |

In Table 1, the bonding strength was determined by measuring the tensile strength of a lead soldered directly to a thick film electrode which had a diameter of 0.6 mm and which was formed on a disk-shaped dielectric ceramic element assembly having a diameter of 14.0 mm and a thickness of 0.5 mm by baking as described above, while pulling the lead at a constant rate of 120 mm/min.

The solderability was judged by visual observation the dielectric ceramic element assembly on which the thick film electrode was baked as it was dipped in a solder using rosin flux. The table shows the results of evaluation on the basis of the following criteria:

◎: Very good
o: Good
x: Some practical problems

The metal density shown is the value obtained by taking a scanning electron microscope photograph of the electrode surface after polishing the cross section of the dielectric ceramic element assembly on which the thick film electrode was baked, and then quantifying the copper area in the electrode area by image analysis. The areas of the glass layer and the reactive layer in the interface were determined by the same method, and divided by the length of the measured interface. The results of calculation are respectively shown as the average thicknesses of the glass layer and the reactive layer.

The results of measurement shown in Table 1 will be described. In consideration of the object of the present invention to improve the characteristics such as electrostatic capacity (Cap) and dissipation factor (DF), an overall evaluation was made on the basis of the following criteria:

◎: Excellent
o: Good
Δ: No practical problem (acceptable)
x: Some practical problems Table 1 reveals that the use of the above copper powder improves the electrostatic capacity, dissipation factor, solderability and bonding strength when glass frit is used in an amount optimum for the copper powder. This is because the copper powder used in the present invention has a fine particle size and good dispersibility, and, when such a powder having good dispersibility is used, the metal density of the thick film electrode after baking is very high, and a dense electrode film can be formed. Therefore, the baked thick film electrode and ceramic can be bonded with a small amount of glass, and the glass layer and reactive layer formed in the interface can be made as thin as possible.

In Example 1, the samples having the best characteristics are shown by ◎ in overall evaluation in Table 1.

Example 2

A conductive composition comprising a silver powder as the conductive powder was produced by the following process:

70 wt % of fine silver powder (metal density 10.492 g/cm$^3$, average particle size 1.52 μm, dispersibility 72%) which was obtained by surface treatment using the same method as Example 1, a glass frit in the amounts shown in Table 2 (which frit comprised 10 to 59.5 mol % of $Bi_2O_3$, 30 to 70 mol % of CdO, 10 to 60 mol % of $B_2O_3$, and 0.5 to 20 mol % of CoO and disclosed in Japanese Patent Publication No. 61-54831) and the balance being an organic vehicle produced by dissolving 8 wt % of ethyl cellulose in terpineol were prepared. These components were sufficiently dispersed by using a kneader such as a three-roll mill to produce various silver pastes for baked electrodes.

The thus-obtained paste was screen-printed on a barium titanate dielectric ceramic having a diameter of 14.0 mm and a thickness of 0.5 mm, and then burned at a burning temperature of 800° C. for 60 minutes in air to produce a ceramic capacitor.

The thus-obtained ceramic capacitor was measured with respect to the electrostatic capacity (Cap), dissipation factor (DF), bonding strength, solderability, metal density, and the average thicknesses of the glass layer and the reactive layer by the same methods as Example 1. The results obtained are shown in Table 2.

TABLE 2

Silver Powder (Average particle size 1.52 μm/Dispersibility 72%)

| Amount of Glass Added (%) | Metal Density (%) | Average Thickness (μm) | | | Solderability | Cap (nF) | Df (%) | Bonding strength (kg) | Overall Evaluation |
| --- | --- | --- | --- | --- | --- | --- | --- | --- | --- |
| | | Glass Layer | Reactive Layer | Total | | | | | |
| 22 | 68 | 3.2 | 2.4 | 5.6 | x | 9.10 | 2.63 | — | x |
| 20 | 70 | 2.8 | 2.1 | 4.9 | x | 9.82 | 2.52 | — | x |

TABLE 2-continued

Silver Powder (Average particle size 1.52 μm/Dispersibility 72%)

| Amount of Glass Added (%) | Metal Density (%) | Average Thickness (μm) | | | Solderability | Cap (nF) | Df (%) | Bonding strength (kg) | Overall Evaluation |
|---|---|---|---|---|---|---|---|---|---|
| | | Glass Layer | Reactive Layer | Total | | | | | |
| 18 | 70 | 2.7 | 1.7 | 4.4 | x | 10.25 | 2.31 | — | x |
| 16 | 85 | 1.6 | 1.0 | 2.6 | x | 18.97 | 2.07 | — | x |
| 14 | 86 | 1.0 | 0.5 | 1.5 | ◉ | 19.01 | 1.88 | 0.5 | ◉ |
| 12 | 86 | 0.8 | 0.5 | 1.3 | ◉ | 21.84 | 0.72 | 0.8 | ◉ |
| 10 | 88 | 0.6 | 0.3 | 0.9 | ◉ | 21.73 | 0.70 | 1.2 | ◉ |
| 8 | 91 | 0.5 | 0.2 | 0.7 | ◉ | 22.65 | 0.70 | 1.8 | ◉ |
| 6 | 92 | 0.2 | 0.0 | 0.2 | ○ | 24.95 | 0.76 | 2.2 | ○ |
| 4 | 98 | 0.1 | 0.0 | 0.1 | ○ | 25.20 | 0.72 | 3.6 | ○ |
| 2 | 98 | 0.1 | 0.0 | 0.1 | ○ | 26.35 | 0.81 | 3.6 | ○ |
| 1 | 98 | 0.1 | 0.0 | 0.1 | ○ | 26.24 | 0.82 | 2.7 | ○ |
| 0.0 | 96 | 0.0 | 0.0 | 0.0 | ○ | 23.28 | 1.42 | — | x |

The results of measurement shown in Table 2 will be described below. The overall evaluation was made on the basis of the same criteria as Example 1.

Table 2 reveals that the use of the silver powder improves electrostatic capacity, dissipation factor, solderability and terminal tensile strength when glass frit is added in an amount optimum for the silver powder. This is because the silver powder used in the present invention has a fine particle size and good dispersibility, and when such a powder having good dispersibility is used, like the copper electrode of Example 1, a dense electrode film can be formed. Therefore, the electrode and ceramic can be bonded with a small amount of glass, and the glass layer and the reactive layer formed in the interface can be made as thin as possible.

In Example 2, the samples having the best characteristics are shown by ◉ in overall evaluation in Table 2.

Since the electronic part of the present invention comprises thick film electrodes having a structure with a high metal density, it is possible to suppress the excessive formation of the glass layers and reactive layers at the interfaces between the thick film electrodes and the electronic part element, and thus improve the electrical characteristics of the electronic part.

What is claimed is:

1. A ceramic electronic part comprising a ceramic element and at least one baked thick film electrode comprising a conductive powder and glass frit on a surface of the ceramic element, said electrode comprising a conductive layer comprising the conductive powder and a glass layer comprising said frit, wherein said glass layer is disposed on the interface with the ceramic element.

2. A ceramic electronic part according to claim 1, wherein the average thickness of the glass layer is about 0.1 to 1.5 μm.

3. A ceramic electronic part according to claim 2, wherein the glass layer comprises a first layer of glass frit unreacted with the ceramic and having an average thickness of about 0.1 to 1.0 μm.

4. A ceramic electronic part according to claim 3, wherein the first layer has an average thickness of about 0.1 to 0.5 μm.

5. A ceramic electronic part according to claim 4, wherein the glass layer comprises a second layer of glass frit reacted with the ceramic and having an average thickness of about 0.5 μm or less.

6. A ceramic electronic part according to claim 5, wherein the percent metal density of each of the thick film electrodes $$((A-B-C)/A) \times 100$$

wherein A is the total cross-sectional area of the thick film electrodes, B is the cross-sectional area of the glass layers, and C is the cross-sectional area of pores, is 86 to 98%.

7. A ceramic electronic part according to claim 6, wherein the percent metal density is about 90 to 98%.

8. A ceramic electronic part according to claim 7, wherein the conductive powder is copper.

9. A ceramic electronic part according to claim 3, wherein the percent metal density of each of the thick film electrodes $$((A-B-C)/A) \times 100$$

wherein A is the total cross-sectional area of the thick film electrodes, B is the cross-sectional area of the glass layers, and C is the cross-sectional area of pores, is 86 to 98%.

10. A ceramic electronic part according to claim 9, wherein the percent metal density is about 90 to 98%.

11. A ceramic electronic part according to claim 2, wherein the percent metal density of each of the thick film electrodes $$((A-B-C)/A) \times 100$$

wherein A is the total cross-sectional area of the thick film electrodes, B is the cross-sectional area of the glass layers, and C is the cross-sectional area of pores, is 86 to 98%.

12. A ceramic electronic part according to claim 11, wherein the percent metal density is about 90 to 98%.

13. A ceramic electronic part according to claim 1, wherein the percent metal density of each of the thick film electrodes $$((A-B-C)/A) \times 100$$

wherein A is the total cross-sectional area of the thick film electrodes, B is the cross-sectional area of the glass layers, and C is the cross-sectional area of pores, is 86 to 98%.

14. A ceramic electronic part according to claim 13, wherein the percent metal density is about 90 to 98%.

* * * * *